United States Patent
Adyanthaya et al.

(10) Patent No.: US 9,503,511 B2
(45) Date of Patent: Nov. 22, 2016

(54) DELIVERY OF MULTIMEDIA SERVICE IN MOBILE NETWORK

(75) Inventors: Shreya Adyanthaya, Karnataka (IN); Manohara Pai M M, Udupi (IN)

(73) Assignee: MANIPAL UNIVERSITY (IN)

( * ) Notice: Subject to any disclaimer, the term of this patent is extended or adjusted under 35 U.S.C. 154(b) by 199 days.

(21) Appl. No.: 13/808,910

(22) PCT Filed: Dec. 1, 2010

(86) PCT No.: PCT/IB2010/055522
§ 371 (c)(1),
(2), (4) Date: Jan. 8, 2013

(87) PCT Pub. No.: WO2012/004638
PCT Pub. Date: Jan. 12, 2012

(65) Prior Publication Data
US 2013/0132520 A1 May 23, 2013

(30) Foreign Application Priority Data
Jul. 8, 2010 (IN) .......................... 1949/CHE/2010

(51) Int. Cl.
*G06F 15/16* (2006.01)
*H04L 29/08* (2006.01)
*H04W 28/18* (2009.01)
*H04L 29/06* (2006.01)

(52) U.S. Cl.
CPC ............... *H04L 67/10* (2013.01); *H04L 65/80* (2013.01); *H04W 28/18* (2013.01)

(58) Field of Classification Search
CPC ..... H04L 1/0026; H04L 65/80; H04L 67/10; H04L 43/08; H04L 65/60
USPC .......................................... 709/217
See application file for complete search history.

(56) References Cited

U.S. PATENT DOCUMENTS 5,461,611 A 10/1995 Drake, Jr. et al.
6,747,961 B1 6/2004 Ahmed et al.
(Continued)

FOREIGN PATENT DOCUMENTS

CN 1717674 A 1/2006

OTHER PUBLICATIONS

Notification of Transmittal of the International Search Report and the Written Opinion of the International Searching Authority, May 2, 2011.
(Continued)

*Primary Examiner* — Liangche A Wang
*Assistant Examiner* — Ayele Woldemariam
(74) *Attorney, Agent, or Firm* — Ren-Sheng International (57) ABSTRACT

Embodiments of the present disclosure set forth a method for optimizing a multimedia service in a mobile network including a server and a client. The method includes: collecting QoS related information of a channel in the mobile network; collecting or retrieving at least one parameter associated with a usage preference of the mobile network or the client; determining a QMS metric based on the QoS related information and the at least one parameter for the channel periodically; notifying the server a first QMS metric when the difference between a second QMS metric and the first QMS metric exceeds a threshold, wherein the first QMS metric is obtained immediately succeeding the second QMS metric; and receiving a multimedia content in a manner that is determined based on the first QMS metric.

16 Claims, 6 Drawing Sheets

(56) References Cited

U.S. PATENT DOCUMENTS

| | | | |
|---|---|---|---|
| 7,076,552 B2 | 7/2006 | Mandato | |
| 7,403,487 B1 | 7/2008 | Foladare et al. | |
| 7,911,968 B1* | 3/2011 | Foladare et al. | 370/252 |
| 2005/0025180 A1* | 2/2005 | Curcio et al. | 370/468 |
| 2006/0203773 A1 | 9/2006 | Georges et al. | |
| 2007/0237098 A1* | 10/2007 | Wang | 370/256 |
| 2009/0077256 A1* | 3/2009 | Madan | 709/231 |
| 2009/0225762 A1* | 9/2009 | Davidson et al. | 370/401 |
| 2010/0293287 A1* | 11/2010 | Kobayashi | 709/231 |

OTHER PUBLICATIONS

Bogdan Ciubotaru et al., "SASHA—A Quality-Oriented Handover Algorithm for Multimedia Content Delivery to Mobile Users", IEEE Transactions on Broadcasting, Jun. 2009, pp. 437-450, vol. 55, Issue 2.

Anita Singhrova et al., "Adaptive Vertical Handoff Decision Algorithm for Wireless Heterogeneous Networks", 11th IEEE International Conference on High Performance Computing and Communications, IEEE Computer Society, 2009, pp. 476-481.

Jiping LV et al., "Intelligent Seamless Vertical Handoff Algorithm for the Next Generation Wireless Networks", Proceedings of the 1st International ICST Conference on Mobile Wireless Middleware, Operating System and Applications, May 16, 2010.

Ahmed H. Zahran et al., "Signal Threshold Adaptation for Vertical Handoff in Heterogeneous Wireless Networks", Journal in Mobile Networks and Applications, May 22, 2006, pp. 625-640, vol. 11, Issue 4.

Amin Farbod et al., "Vertical Handoff Provisioning and Capacity Planning in the Deployment of Hybrid Networks", 23rd Biennial Symposium on Communications, 2006, pp. 266-269.

Dan Lelescu et al., "Multimedia Over Wireless Networks", EURASIP Journal on Wireless Communications and Networking, 2008, 2 pages.

Giordano, S. et al., "WiSwitch: Seamless Handover Between Multi-Provider Networks", Proceedings of the 2nd Annual Conference on Wireless On-demand Network Systems and Services, Jan. 19-21, 2005, pp. 224-235.

Wan-Seon Lim et al., "Implementation and Performance Study of IEEE 802.21 in Integrated IEEE 802.11/802.16e Networks", Computer Communications, 2009, pp. 134-143, vol. 32.

* cited by examiner

400 A computer program product

402 at least one of one or more instructions for collecting quality of service (QoS) related information of a communication channel in the mobile network;

one or more instructions for collecting or retrieving at least one parameter associated with a user preference of the mobile network or the status of the client;

one or more instructions for determining a quality of multimedia streaming (QMS) metric based on the QoS related information and the at least one parameter for the communication channel periodically;

one or more instructions for notifying the server a first QMS metric when the difference between a second QMS metric and the first QMS metric exceeds a threshold, wherein the first QMS metric is obtained immediately succeeding the second QMS metric; and/or one or more instructions for receiving a multimedia content in a manner that is determined based on the first QMS metric

| 404 a signal bearing medium | 406 a communication medium |
|---|---|
| 408 a computer readable medium | 410 a recordable medium |

FIG. 4

500 A computer program product

502 at least one of one or more instructions to receive a QMS metric from a client;

one or more instructions to allocate a streaming rate for a channel in the mobile network;

one or more instructions to determine whether the channel is fading;

one or more instructions to generate a substream based on the QMS metric; or one or more instructions to send the substream to a client

504 a signal bearing medium

506 a communication medium

508 a computer readable medium

510 a recordable medium

DELIVERY OF MULTIMEDIA SERVICE IN MOBILE NETWORK

CROSS-REFERENCE TO RELATED APPLICATIONS

The present application is a U.S. National Stage filing under 35 U.S.C. §371 of International Application No. PCT/IB2010/055522, filed on Dec. 1, 2010 and entitled "DELIVERY OF MULTIMEDIA SERVICE IN MOBILE NETWORK." The International Application claims priority to Indian Patent Application 1949/CHE/2010, filed on Jul. 8, 2010. The Indian Patent Application and the International Application, including any appendices or attachments thereof, are incorporated by reference herein in their entirety.

TECHNICAL FIELD

The present disclosure relates generally to systems and techniques for delivering a multimedia service in a mobile network.

BACKGROUND

People enjoy multimedia services (e.g., watching movies, listening to songs, or using multimedia messages to communicate) supported by their mobile devices. However, delivering high quality multimedia service, especially to mobile devices, has been a challenge.

SUMMARY

Some embodiments of the present disclosure may generally relate to example methods for delivering a multimedia service in a mobile network including a server and a client. One example method may include collecting quality of service (QoS) related information of a communication channel in the mobile network, collecting or retrieving at least one parameter associated with a usage preference of the mobile network or the client, determining a quality of multimedia streaming (QMS) metric based on the QoS related information and the at least one parameter for the communication channel periodically, notifying the server a first QMS metric when the difference between a second QMS metric and the first QMS metric exceeds a threshold, wherein the first QMS metric is obtained immediately succeeding the second QMS metric, and receiving a multimedia content in a manner that is determined based on the first QMS metric.

Additional embodiments of the present disclosure may generally relate to example methods for delivering a multimedia service in a mobile network including a server and a client. One example method may include receiving a QMS metric from the client, allocating a streaming rate for a channel in the mobile network, determining whether the channel is fading, generating a substream based on the QMS metric, and sending the substream to the client.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter alia, to methods, apparatus, computer programs, and systems related to an optimization of a multimedia service in a mobile network.

In the disclosure, a "mobile network" generally refers to a network that includes a server and a mobile client. The terms "client" and "mobile client" are interchangeably used. A "metric" generally refers to one or more properties associated with a route in computer networking. Some example properties include, without limitation, number of hops, packet loss, latency, throughput, bandwidth, path reliability, and path bandwidth. A "substream" generally refers to either a copy of a streaming multimedia content or a portion of a streaming multimedia content. A "communication channel" or a "channel" generally refers to a physical or logical link that connects a data source (e.g., server) to a data sink (e.g., client).

In a mobile network, a server may deliver to a client multiple types of multimedia content. The server may also assign different priorities for transmitting the different types of multimedia content. For example, the server may deliver two types of multimedia content, a streaming video and an MP3 song, to the client. Suppose the priority for transmitting the streaming video is higher than the priority for transmitting the MP3 song. Based on the priorities, the server may transmit the streaming video via a selected communication channel before transmitting the MP3 song.

In some embodiments, multiple communication channels may exist between the server and the client. The channels may be established using different network technologies (e.g., WLAN and 3G), which are supported in a mobile network. The server may identify and/or select one or more of the communication channels based on certain metric associated with the channels, which will be detailed in subsequent discussions, for transmitting the multimedia content.

In some embodiments, the client may gather quality of service (QoS) related information (e.g., bandwidth, latency, jitter, reliability, and others) for all available communication channels in a mobile network. The client may also collect or retrieve parameters associated with the client itself or general usage preferences. Some example parameters are further described in the paragraphs below. The client is configured to determine a quality of multimedia streaming (QMS) metric for each available channel in the mobile network based on the QoS related information and certain parameters. How the QMS metric may be determined is further detailed in subsequent paragraphs. The client is further configured to notify the server when the QMS metric of a channel varies beyond a threshold. In response to the notification, the server is configured to transmit the multimedia content using one or more communication channels in the mobile network.

Figure 1:
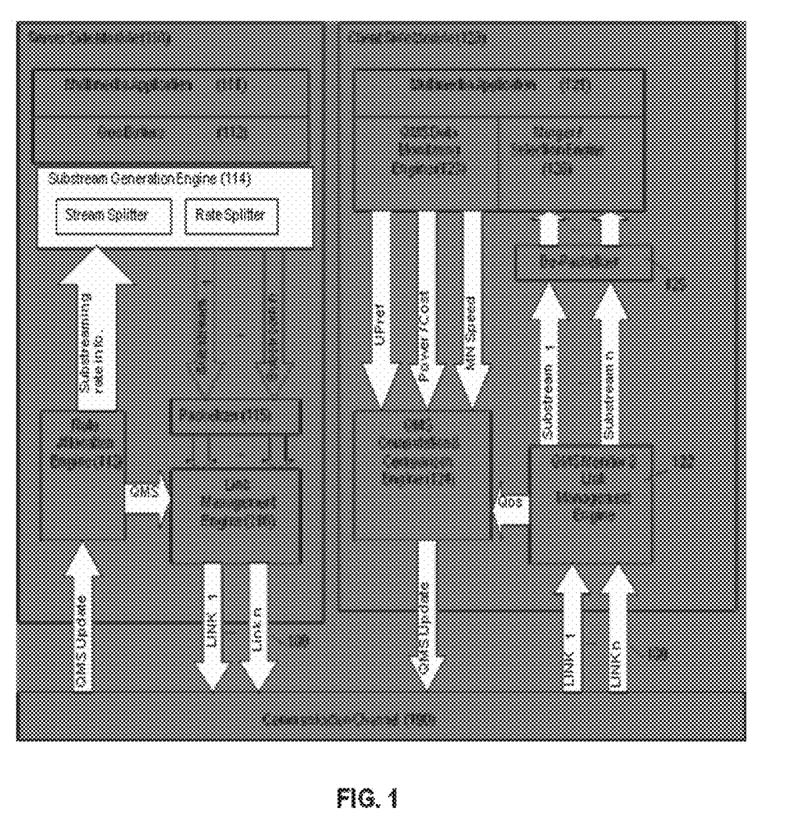
FIG. 1 shows a block diagram of an illustrative embodiment of a system for delivering a multimedia service in a mobile network.

FIG. 1 shows a block diagram of an illustrative embodiment of a system 100 for delivering a multimedia service in a mobile network. The system 100 may include a first module 110 at a server (hereinafter "server side module") and a second module 120 at a client (hereinafter "client side module"). The server side module 110 and the client side module 120 communicate with each other via one or more communication channels 190.

In the server side module 110, a multimedia application 111 supports a multimedia service. The multimedia application 111 may be programmed to utilize one or more QoS buffers 112. In some embodiments, each instance of the multimedia application 111 may utilize one of the QoS buffers 112. For example, suppose one instance of the multimedia application 111 supports a video service and the other instance of the supports an audio service. Two of the QoS buffers 112 may be utilized by these two different services.

In some embodiments, the server side module 110 may assign each of the QoS buffers 112 a transmission priority based on the relationship between the buffer and the multimedia application 111. Continuing with the video service and audio service example above, the transmission priority assigned to the buffer for the video service may be higher than the transmission priority assigned to the buffer for the audio service. When one or more of the communication channels 190 are selected, the server side module 110 may assign a higher priority to the multimedia application 111 supporting the video service to use the selected channels to transmit data.

The client side module 120 includes a multimedia application 121 to process the multimedia content received from the server side module 110. The client side module 120 may further include a QoS monitor and link management engine 122, a QMS data monitoring engine 123, and a QMS computation and comparison engine 124.

In some embodiments, the QoS monitor and link management engine 122 may gather QoS related information pertaining to all available communication channels 190. The QMS data monitoring engine 123 may be configured to collect or retrieve parameters associated with the client itself or general usage preferences. Some example parameters associated with the client may include, without limitation, range of physical movement of the client, moving speed of the client, and power usage information of the client. Some example parameters associated with the general usage preferences may include, without limitation, cost of using an available channel, quality of experience (QoE) related information pertaining to multimedia content received by the user of the multimedia application 121, and preferences of using a specific channel for streaming multimedia contents between the server and the client. The parameters set forth above may influence the choice of a channel between the server and the client. For example, for a mobile client whose mobility speed is high, a channel that supports a wide coverage area may be considered.

Based on the gathered QoS related information and the aforementioned collected or retrieved parameters, the QMS computation and comparison engine 124 may be configured to periodically calculate a QMS metric for each available channel. The QMS computation and comparison engine 124 may be further configured to compare a first QMS metric against a second QMS metric. The second QMS metric is obtained immediately after having obtained the first QMS metric. When the difference between the two QMS metrics exceeds a threshold value (e.g., 1%), the QMS computation and comparison engine 124 may be configured to send the updated QMS metric (i.e., the second QMS metric) to the server side module 110.

In some embodiments, the server side module 110 may include a rate allocation engine 113 which may be configured to receive the updated QMS metric and generate substreaming rate information for each available channel. The substreaming rate information for a channel may correspond to a fraction of the overall streaming rate between the server and the client. In response to a change in the QMS metric associated with a channel, the rate allocation engine 113 is configured to recalculate streaming rates among all available channels in the mobile network. The rate allocation engine 113 may also forward the updated QMS metric to a link management engine 116. The link management engine 116 may be configured to allocate resources for links between the server 110 and the client 111 based on the updated QMS metric. For example, the link management engine 116 may retrieve information associated with the range of physical movement of the client in the updated QMS metric to determine the strengths of the links. Based on the determined strengths, the link management engine 116 may be configured to allocate resources at the server side 110 to manage and maintain the links.

In some embodiments, the server side module 110 may include a substream generation engine 114, which may be configured to receive the substreaming rate information of each channel from the rate allocation engine 113. The substream generation engine 114 may be configured to perform a stream splitter operation and/or a rate splitter operation based on the received substreaming rate information.

In some embodiments, the substream generation engine 114 may be configured to monitor the substreaming rate information of channels. For example, the substream generation engine 114 may compare the substreaming rate information of a channel to the previously received substreaming rate information of the channel. When the substreaming rate information of the channel is shown to be decreasing in several consecutive comparisons, the substream generation engine 114 may determine the channel is fading. On the other hand, the substreaming rate information of the channel is shown to increase in several consecutive comparisons, the substream generation engine 114 may determine the channel is strengthening. In some embodiments, the substream generation engine 114 may determine that a first channel is fading based on the QMS update while a second channel is strengthening. This may correspond to a situation, in which the client is moving from a first coverage area associated with the first channel to a second coverage area associated with the second channel. In some embodiments, the substream generation engine 114 may be configured to perform a rate splitter operation, so that the overall streaming rate may be split between the first channel and the second channel. Here, the multimedia content being transmitted via the first channel and the second channel may be copies of the same multimedia contents.

In some other embodiments, when the substreaming rate information does not show that a channel is fading, the substream generation engine 114 may be configured to perform a stream splitter operation so that a multimedia content is split to various substreams, which are sent through all available channels. Therefore, load sharing may be achieved. In such embodiments, substreams may be sent through channels established by different network technologies. The substreams may be processed by a packetizer 115. When the packets are being sent via multiple channels established by multiple network technologies, the packets have different data formats specified by the different network technologies. The packetizer 115 may be configured to generate packets that comply with the characteristics of the channels through which the packets are transmitted. A link management engine 116 may be configured to arrange a packet to be sent through an appropriate channel.

The packets may then be received by the QoS monitor and link management engine 122 and forwarded to a de-packetizer 125 to retrieve the substreams. A merger/selection engine 126 may be configured to merge the substreams into a complete multimedia content if the packets are generated based on the stream splitter operation. If the substreams are multiple copies of a multimedia content generated based on the rate splitter operation, the merger/selection engine 126 may be configured to select a best copy from the received copies.

Figure 2:
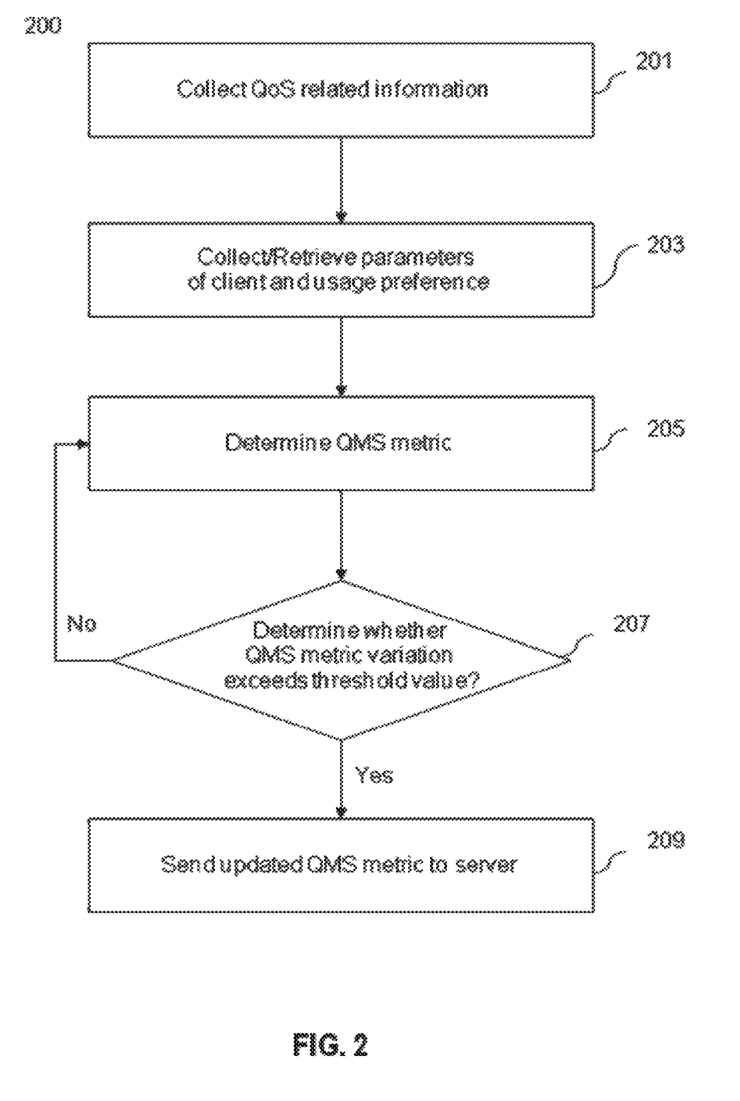
FIG. 2 is a flow chart of an illustrative embodiment of a method for delivering a multimedia service from a client perspective in a mobile network.

FIG. 2 is a flow chart of an illustrative embodiment of a method for delivering a multimedia service from a client perspective in a mobile network. The method 200 may include one or more operations, functions, or actions as illustrated by blocks 201, 203, 205, 207 and/or 209. The various blocks are not intended to be limiting to the described embodiments. For example, one skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In block 201 (collect QoS related information), QoS related information of each available channel in the mobile network is collected. In one implementation, the aforementioned QoS monitor and link management engine may collect the QoS related information. In block 203 (collect/retrieve parameters of client and usage preference), parameters associated with the client itself or usage preferences, such as the ones discussed in conjunction with FIG. 1, may be collected or retrieved. Continuing the example implementation, the aforementioned QMS data monitoring engine may collect and/or retrieve such parameters.

In block 205 (determine QMS metric), a QMS metric for each available channel may be periodically determined based on the QoS related information collected in block 201, and the parameters collected or retrieved in block 203. Subsequently determined QMS metrics may be stored for further processing. Continuing the example implementation, the aforementioned QMS computation and comparison engine may determine a QMS metric.

In block 207 (determine whether QMS metric variation exceeds threshold value), a first QMS metric of a channel may be compared against a second QMS metric of the channel, which is subsequently obtained after the first QMS metric. When the variation is equal to or below a threshold value, the method 200 returns to block 205. When the variation exceeds a threshold, the method 200 then goes to block 209 (send updated QMS metric to server), where the second metric is sent to the server. Continuing the example implementation, the aforementioned QMS computation and comparison engine may determine whether the QMS metric variation exceeds a threshold value and send updated QMS metric to the server.

Figure 3:
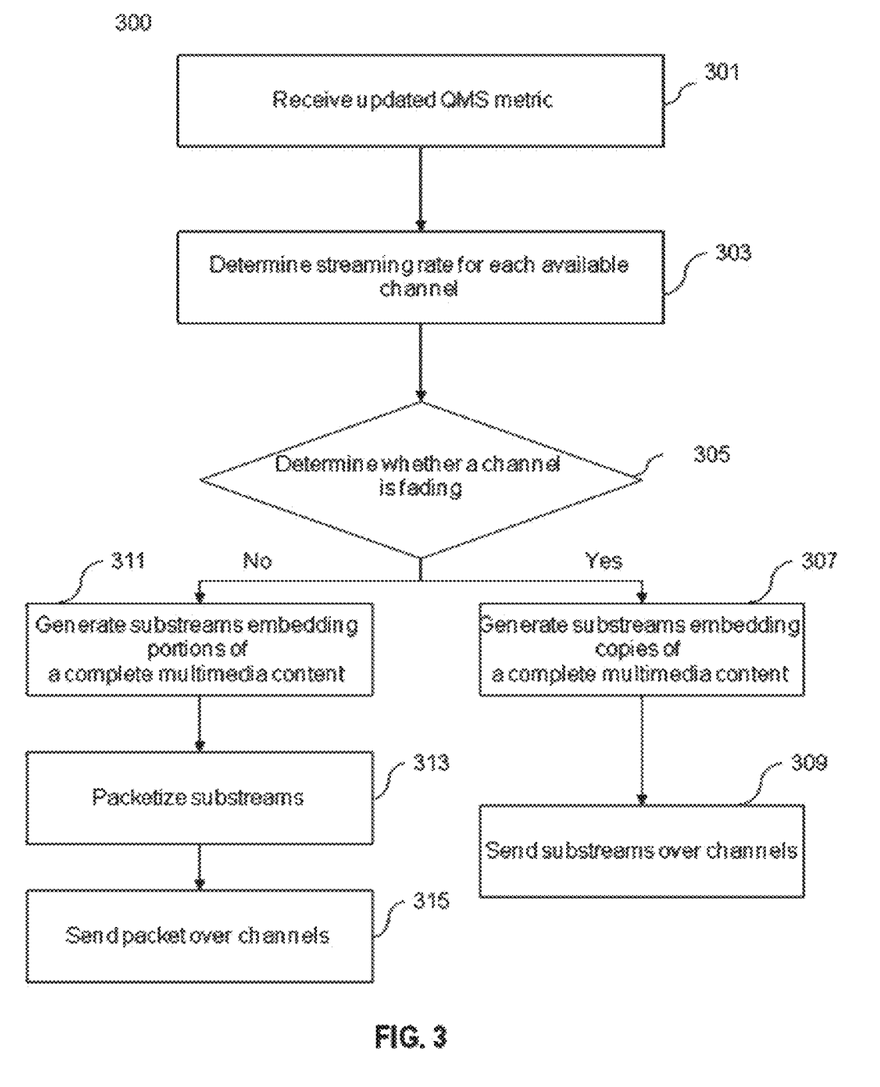
FIG. 3 is a flow chart of an illustrative embodiment of a method for delivering a multimedia service from a server perspective in a mobile network.

FIG. 3 is a flow chart of an illustrative embodiment of a method for delivering a multimedia service from a server perspective in a mobile network. The method 300 may include one or more operations, functions, or actions as illustrated by blocks 301, 303, 305, 307, 309, 311, 313, and/or 315. The various blocks are not intended to be limiting to the described embodiments. For example, one skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In block 301 (receive updated QMS metric), the updated QMS metric may be received by a server in the mobile network. In one implementation, the aforementioned rate allocation engine may receive the updated QMS metric. In block 303 (determine streaming rate for each available channel), different streaming rates may be determined for the available channels in the mobile network based on the updated QMS metric. Continuing the example implementation, the aforementioned rate allocation engine may determine the streaming rates.

In block 305 (determine whether a channel is fading), based on the determined streaming rate for each channel, whether a channel is fading may be determined. Continuing the example implementation, the aforementioned substream generation engine may determine whether a channel is fading. When a channel is determined to be fading, the method 300 goes to blocks 307 and 309 where the rate splitter operation as set forth above is performed. When no channel is determined to be fading, the method goes to blocks 311, 313, and 315, where the stream splitter operation as set forth above is performed. Continuing the example implementation, the aforementioned substream generation engine may carry out operations functions, or actions as illustrated by blocks 305, 307, 309, 311, 313, and 315.

Figure 4:
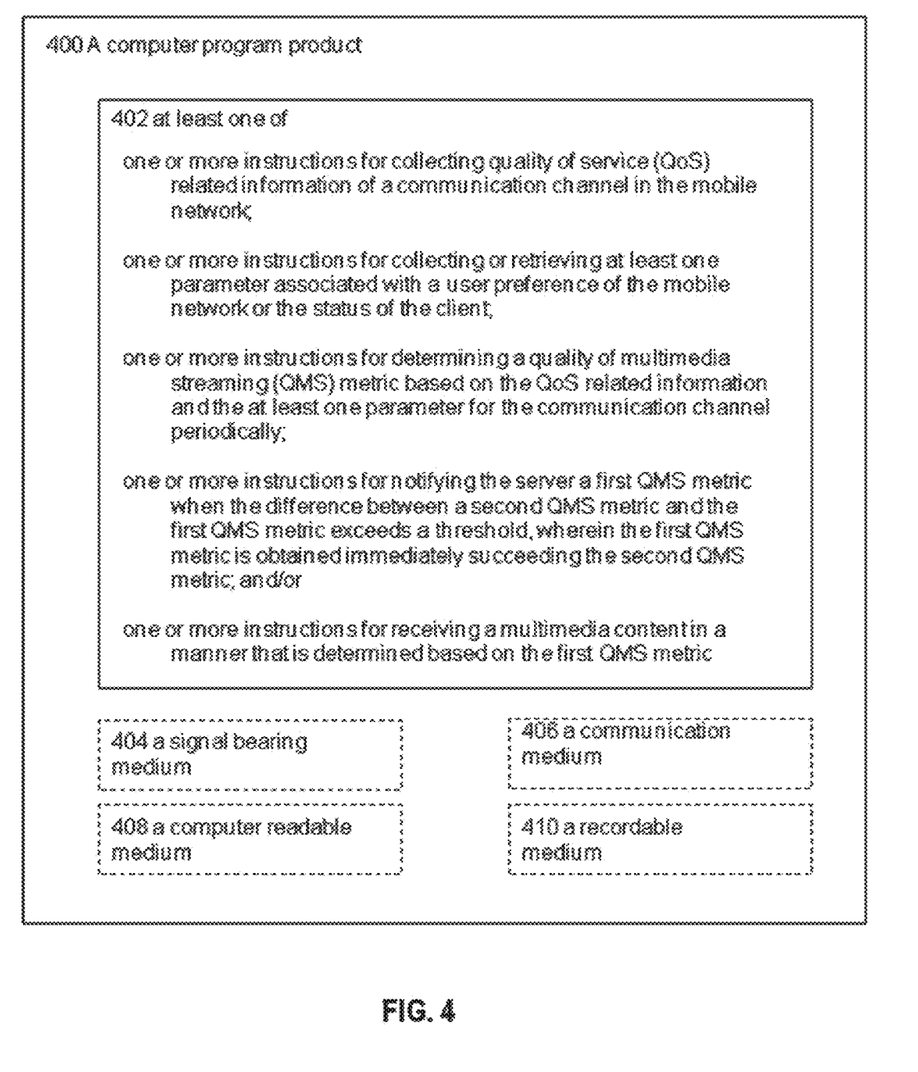
FIG. 4 shows a block diagram illustrating a computer program product that is arranged for delivering a multimedia service from a client perspective in a mobile network.

FIG. 4 shows a block diagram illustrating a computer program product that is arranged for delivering a multimedia service from a client perspective in a mobile network. The computer program product 400 may include one or more sets of executable instructions 402 for executing the method described above and illustrated in FIG. 2. Computer program product 400 may be transmitted in a signal bearing medium 404 or another similar communication medium 406. Computer program product 400 may also be recorded in a computer readable medium 408 or another similar recordable medium 410.

Figure 5:
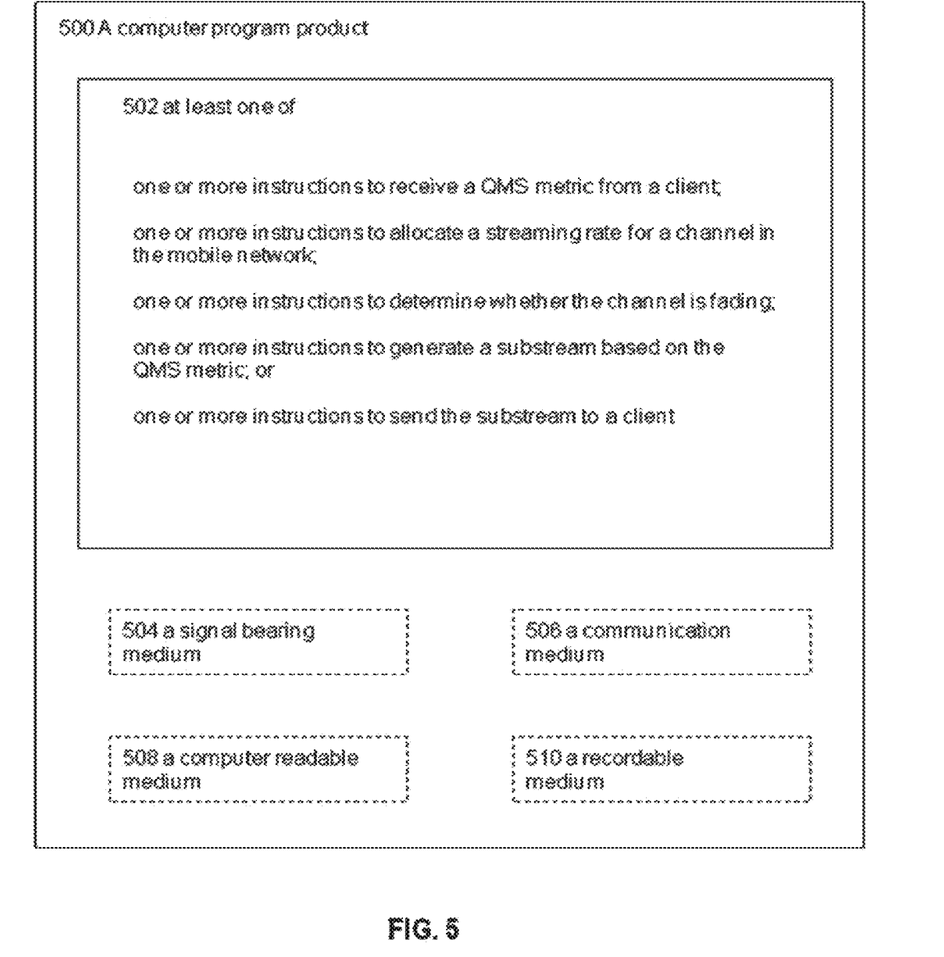
FIG. 5 shows a block diagram illustrating a computer program product that is arranged for delivering a multimedia service from a server perspective in a mobile network.

FIG. 5 shows a block diagram illustrating a computer program product that is arranged for delivering a multimedia service from a server perspective in a mobile network. The computer program product 500 may include one or more sets of executable instructions 502 for executing at least the method described above and illustrated in FIG. 3. Computer program product 500 may be transmitted in a signal bearing medium 504 or another similar communication medium 506. Computer program product 500 may also be recorded in a computer readable medium 508 or another similar recordable medium 510.

Figure 6:
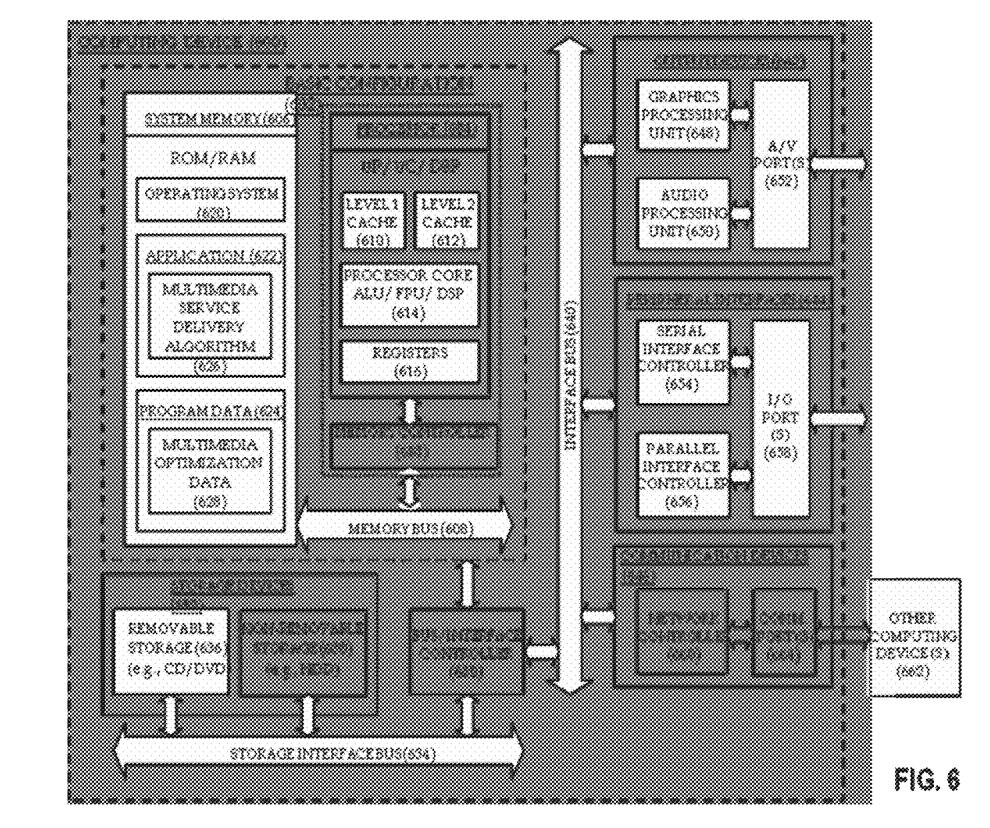
FIG. 6 shows a block diagram of an illustrative embodiment of a computing device that is arranged for delivering a multimedia service.

FIG. 6 shows a block diagram of an illustrative embodiment of a computing device that is arranged for delivering a multimedia service. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. In some embodiments, application 622 may include a multimedia service delivery algorithm 626 that is arranged to perform the functions as described herein including those described with respect to the steps 201, 203, 205, 207, and 209 of the method 200 of FIG. 2. Program data 624 may include multimedia optimization data 628 that may be useful for the operation of multimedia service delivery algorithm 626 as will be further described below. In some embodiments, the multimedia optimization data 628 may include, without limitation, the QoS related information collected in block 201 and the parameters collected or retrieved in block 203 of the method 200 of FIG. 2. In some embodiments, application 622 may be arranged to operate with program data 624 on operating system 620 such that implementations of multimedia service optimization may be provided as described herein. This described basic configuration 602 is illustrated in FIG. 6 by those components within the inner dashed line.

In some other embodiments, application 622 may include multimedia service delivery algorithm 626 that is arranged to perform the functions as described herein including those described with respect to the steps 301, 303, 305, 307, 309, 311, 313, and 315 of the method 300 of FIG. 3. Program data 624 may include multimedia optimization data 628 that may be useful for the operation of multimedia service delivery algorithm 626 as will be further described below. In some embodiments, the multimedia optimization data 628 may include, without limitation, the updated QMS metric received in block 301 of the method 300 of FIG. 3.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664. In some embodiments, the other computing devices 662 may include other applications, which may be operated based on the results of the application 622.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal digital assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method to deliver a multimedia service in a mobile network including a server and a client, the method comprising:

collecting quality of service (QoS) related information of communication channels in the mobile network;

collecting or retrieving at least one parameter associated with the client or a usage preference of any of the communication channels at the client, wherein the at least one parameter comprises range of physical movements of the client, moving speed of the client, power usage information of the client, cost of using an available communication channel, quality of experience (QoE) related information pertaining to the multimedia content, and/or preferences of using a specific communication channel;

determining a set of quality of multimedia streaming (QMS) metrics at the client based on (1) the QoS related information and (2) the at least one parameter for the communication channels periodically;

notifying the server a first QMS metric associated with a first communication channel of the communication channels when the difference between a second QMS metric associated with the first communication channel and the first QMS metric exceeds a threshold, wherein the first QMS metric is determined at the client and obtained immediately succeeding the second QMS metric; and receiving a multimedia content from a second communication channel of the communication channels or a combination of the first communication channel and the second communication channel in a manner that is determined partly based on the first QMS metric, wherein the difference between two immediately succeeding obtained QMS metrics associated with the second communication channel does not exceed the threshold.

2. The method of claim 1, further comprising selecting a copy from multiple copies of the multimedia content.

3. The method of claim 1, further comprising merging portions of the multimedia content.

4. A method to deliver a multimedia service in a mobile network comprising multiple communication channels between a server and a client, the method comprising:

receiving a first QMS metric associated with a first communication channel of the communication channels from and determined by the client, wherein the first QMS metric is determined based on (1) a QoS related information and (2) at least one parameter associated with the client or a usage preference of any of the communication channels, and wherein the at least one parameter comprises range of physical movements of the client, moving speed of the client, power usage information of the client, cost of using an available communication channel, quality of experience (QoE) related information pertaining to the multimedia content, and/or preferences of using a specific communication channel, and wherein a difference between the first QMS metric and a second QMS metric associated with the first communication channel determined at the client prior to the first QMS metric exceeds a threshold;

allocating a streaming rate for the first communication channel and a second communication channel of the communication channels, wherein a difference between a third QMS metric associated with the second communication channel and a fourth QMS metric associated with the second communication channel obtained immediately succeeding the third QMS metric does not exceed the threshold;

generating a substream partly based on the first QMS metric; and sending the substream through the first communication channel or a combination of the first communication channel and the second communication channel to the client.

5. The method of claim 4, wherein the substream is a copy of a multimedia content.

6. The method of claim 4, wherein the substream is a portion of a multimedia content.

7. The method of claim 6, further comprising providing a packet for the substream.

8. The method of claim 7, wherein the packet complies with characteristics of the first communication channel.

9. A non-transitory computer-readable medium containing a sequence of instructions to optimize a multimedia service in a mobile network including a server and a client, which in response to execution by a computing device, cause the computing device to:

collect QoS related information of communication channels in the mobile network;

collect or retrieve at least one parameter associated with the client or a usage preference of any of the communication channels at the client, wherein the at least one parameter comprises range of physical movements of the client, moving speed of the client, power usage information of the client, cost of using an available communication channel, quality of experience (QoE) related information pertaining to the multimedia content, and/or preferences of using a specific communication channel;

determine a set of QMS metrics at the client based on (1) the QoS related information and (2) the at least one parameter for the communication channels periodically;

notify the server a first QMS metric associated with a first communication channel of the communication channels when the difference between a second QMS metric associated with the first communication channel and the first QMS metric exceeds a threshold, wherein the first QMS metric is determined at the client and obtained immediately succeeding the second QMS metric; and receive a multimedia content from a second communication channel of the communication channels or a combination of the first communication channel and the second communication channel in a manner that is determined partly based on the first QMS metric, wherein the difference between two immediately succeeding obtained QMS metrics associated with the second communication channel does not exceed the threshold.

10. A non-transitory computer-readable medium containing a sequence of instructions to optimize a multimedia service in a mobile network comprising multiple communication channels between a server and a client, which when executed in response to execution by a computing device, cause the computing device to:

receive a first QMS metric associated with a first communication channel of the communication channels from and determined by the client, wherein the first QMS metric is determined based on (1) a QoS related information and (2) at least one parameter associated with the client or a usage preference of any of the communication channels, and wherein the at least one parameter comprises range of physical movements of the client, moving speed of the client, power usage information of the client, cost of using an available communication channel, quality of experience (QoE) related information pertaining to the multimedia content, and/or preferences of using a specific communication channel, and wherein a difference between the first QMS metric and a second QMS metric associated with the first communication channel determined at the client prior to the first QMS metric exceeds a threshold;

allocate a streaming rate for the first communication channel and a second communication channel of the communication channels, wherein a difference between a third QMS metric associated with the second communication channel and a fourth QMS metric associated with the second communication channel obtained immediately succeeding the third QMS metric does not exceed the threshold;

generate a substream partly based on the first QMS metric; and send the substream through the first communication channel or a combination of the first communication channel and the second communication channel to the client.

11. The non-transitory computer-readable medium of claim 10, wherein the substream is a copy of a multimedia content.

12. The non-transitory computer-readable medium of claim 10, wherein the substream is a portion of a multimedia content, and the substream is included in a packet which complies with characteristics of the first communication channel or the second communication channel.

13. A computing device to optimize a multimedia service in a mobile network including a server and a client, comprising:

a memory; and a processing unit arranged to interface with the memory, wherein the processing unit is configured to:

collect QoS related information of communication channels in the mobile network;

collect or retrieve at least one parameter associated with the client or a usage preference of any of the communication channels at the client, wherein the at least one parameter comprises range of physical movements of the client, moving speed of the client, power usage information of the client, cost of using an available communication channel, quality of experience (QoE) related information pertaining to the multimedia content, and/or preferences of using a specific communication channel;

determine a set of QMS metrics at the client based on (1) the QoS related information and (2) the at least one parameter for the communication channels periodically;

notify the server a first QMS metric associated with a first communication channel of the communication channels when the difference between a second QMS metric associated with the first communication channel and the first QMS metric exceeds a threshold, wherein the first QMS metric is determined at the client and obtained immediately succeeding the second QMS metric; and receive a multimedia content from a second communication channel of the communication channels or a combination of the first communication channel and the second communication channel in a manner that is determined partly based on the first QMS metric, wherein the difference between two immediately succeeding obtained QMS metrics associated with the second communication channel does not exceed the threshold.

14. A computing device to optimize a multimedia service in a mobile network comprising multiple communication channels between a server and a client, comprising:

a memory; and a processing unit arranged to interface with the memory, wherein the processing unit is configured to:

receive a first QMS metric associated with a first communication channel of the communication channels from and determined by the client, wherein the first QMS metric is determined based on (1) a QoS related information and (2) at least one parameter associated with the client or a usage preference of any of the communication channels, wherein a difference between the first QMS metric and a second QMS metric associated with the first communication channel determined at the client prior to the first QMS metric exceeds a threshold, and wherein the at least one parameter comprises range of physical movements of the client, moving speed of the client, power usage information of the client, cost of using an available communication channel, quality of experience (QoE) related information pertaining to the multimedia content, and/or preferences of using a specific communication channel;

allocate a streaming rate for the first communication channel and a second communication channel of the communication channels, wherein a difference between a third QMS metric associated with the second communication channel and a fourth QMS metric associated with the second communication channel obtained immediately succeeding the third QMS metric does not exceed the threshold;

generate a substream partly based on the first QMS metric; and send the substream through the first communication channel or a combination of the first communication channel and the second communication channel to the client.

15. The computing device of claim 14, wherein the substream is a copy of a multimedia content.

16. The computing device of claim 14, wherein the substream is a portion of a multimedia content, and the substream is included in a packet which complies with characteristics of the first communication channel or the second communication channel the second communication channel.

* * * * *

UNITED STATES PATENT AND TRADEMARK OFFICE
CERTIFICATE OF CORRECTION

| | |
|---|---|
| PATENT NO. | : 9,503,511 B2 |
| APPLICATION NO. | : 13/808910 |
| DATED | : November 22, 2016 |
| INVENTOR(S) | : Adyanthaya et al. |

It is certified that error appears in the above-identified patent and that said Letters Patent is hereby corrected as shown below:

On the Title Page

In item (73), under "Assignee", in Column 1, Line 1, delete "MANIPAL UNIVERSITY (IN)" and insert -- MANIPAL UNIVERSITY, KARNATAKA (IN) --, therefor.

In the Specification

In Column 1, Line 8, delete "§371" and insert -- § 371 --, therefor.

In the Claims

In Column 13, Lines 31-32, in Claim 10, delete "which when executed in response" and insert -- which in response --, therefor.

In Column 15, Lines 22-24, in Claim 16, delete "or the second communication channel the second communication channel." and insert -- or the second communication channel. --, therefor.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*